Patented Jan. 27, 1953

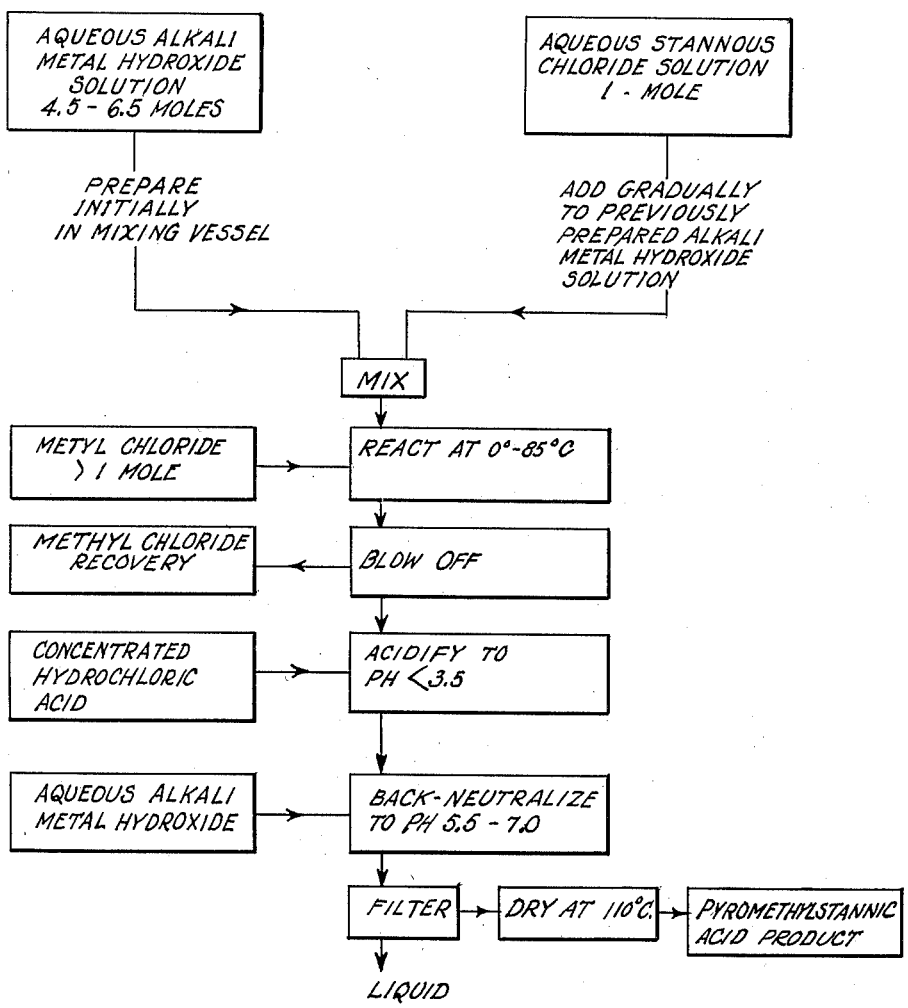

2,626,955

UNITED STATES PATENT OFFICE 2,626,955

PREPARATION OF METHYLSTANNIC ACID

Kenneth C. Eberly, Akron, and Chris E. Best, Uniontown, Ohio, assignors to The Firestone Tire & Rubber Company, Akron, Ohio, a corporation of Ohio Application October 31, 1950, Serial No. 193,156

7 Claims. (Cl. 260—429)

This invention relates to the preparation of methylstannic acid.

One method for the preparation of methylstannic acid, or the corresponding pyro acid, has heretofore been described in a general way by Meyer, Ber. 16, 1443 (1883). That method involved the reaction of sodium stannite, in water-ethanol solution, with methyl iodide, followed by precipitation of the methylstannic acid by bubbling of carbon dioxide through the resultant hot sodium methylstannate solution. The methylstannic acid was converted to the pyromethylstannic acid by heating to 110° C. The method is disadvantageous in that it requires the use of an expensive solvent, ethanol, and an expensive source of methyl radicals, methyl iodide. It has not been suggested that the reaction be carried out in purely aqueous media, probably in anticipation of troubles due to formation of stannous oxide and hydrolysis of the methyl iodide, and also probably due to a belief that an organic solvent would be necessary in order to provide a single phase medium for the reaction of the sodium stannite and methyl iodide. As a matter of fact, these and other difficulties do occur when aqueous media are substituted for aqueous-alcoholic media in the reaction, without the exercise of special techniques hereinafter detailed. Nor was it suggested that the cheaper methyl chloride be used in place of the methyl iodide, probably due to the lesser reactivity of the methyl chloride.

A fact not observed by prior art workers is that methylstannic acid is rather prone to condense with itself to an extent beyond the simple pyro acid, yielding complex materials of greatly diminished chemical activity. For instance, methyltin trimercaptides (useful as stabilizers in vinyl chloride resins) may be formed by the reaction of methylstannic acid with mercaptans. Preparations of methylstannic acid in which extensive condensation has occurred react relatively slowly with mercaptans, and give reduced yields of methyltin trimercaptides.

Accordingly, it is an object of this invention to provide a novel process for the manufacture of methylstannic acid.

Another object is to provide such a process which may be carried out in an expeditious manner, by the use of inexpensive equipment, reactants, and auxiliary materials.

A further object is to provide such a process which may be carried out in an aqueous medium, rather than in an ethanolic medium.

A still further object is to provide such a process which will make use of methyl chloride rather than methyl iodide.

A still further object is to prepare methylstannic acid in good yield and in a highly reactive form.

SYNOPSIS OF THE INVENTION

The process of this invention involves the following steps, carried out under the range of conditions stated. Any substantial departure from these conditions results in reduced yield of product, and/or in reduced activity of the product.

1. An aqueous solution of sodium or potassium stannite is prepared by adding stannous chloride to a vigorously stirred aqueous solution of sodium or potassium hydroxide, keeping the temperature at all times from 0° to 50° C., preferably from 0° to 20° C., and still more preferably in the lower portion of the latter range. For each mole of stannous chloride supplied, from 4.5 to 6.5 moles of the hydroxide must be present in the original solution, i. e., the excess of hydroxide must be from .5 to 2.5 moles for each mole of alkali stannite formed.

2. Methyl chloride is contacted with the alkali stannite solution at temperatures from 0° C. to 85° C., under pressure sufficient to maintain the methyl chloride in the liquid phase. Sufficient agitation and circulation are provided to insure thorough contact of the reactants.

3. When the reaction has proceeded to completion, or to the extent desired, the alkali methylstannate is converted to methylstannic acid, and the latter precipitated by first adding an excess of a strong acid, so as to lower the pH of the solution to 3.5 or below (at this point a considerable proportion of the methylstannic acid may remain out of solution unless the medium is made highly acid) and thereafter adding a soluble base to raise the pH to the range from 5.0 to 7.0 and preferably from 5.5 to 6.0 (which causes the methylstannic acid to substantially completely precipitate). The precipitated methylstannic acid is separated from the mother liquor and dried. The product is obtained in good yield, usually in excess of 85% of theory, and has excellent chemical reactivity.

THE ALKALI STANNITE SOLUTION

More particularly with regard to the preparation of the sodium or potassium stannite solution, the amount of water to be employed should be such that the concentration of alkali stannite will be between about 5% and about 25%, preferably about 10%, by weight of the solution before addition of the methyl chloride. As noted above, an excess of at least .5 mole of alkali metal hydroxide (above that required for the reaction) should be present for each mole of alkali stannite formed. Under these conditions, there will usually occur a slight precipitate of stannous oxide which, however, will be in such form that it redissolves in the subsequent reaction with methyl chloride. If less than this excess is used, the stannous oxide will be precipitated in considerable volume and in unreactive form, and will be lost in the process. On the other hand, an excess of alkali metal hydroxide greater than 2.5 moles for each mole of alkali stannite will substantially reduce the final yields, due to hydrolysis of the methyl chloride.

THE REACTION OF THE METHYL CHLORIDE WITH ALKALI STANNITE

The reaction may be carried out at temperatures ranging 0°–85° C., preferably 25–40° C. The lower limit of temperature is imposed by the freezing of the water and the slowing down of the reaction, and the upper temperature by an increased precipitation of stannous oxide, an increased hydrolysis of the methyl chloride and increased formation of dimethyltin oxide. At these temperatures, the vapor pressure of methyl chloride is above atmospheric, hence the reaction is carried out in a pressure vessel. Agitation is supplied sufficient to insure access of the methyl chloride to all parts of the reaction mass, and to keep any precipitated stannous oxide in suspension.

The reaction will usually progress to substantial completion in about 1 to 90 hours, depending upon the temperature, rate of agitation, and geometry of the reaction vessel. The minimum time of reaction under any set of reaction conditions is determined in practice by the extent of conversion required for profitable operation, as a certain amount of product is formed immediately upon mixing of the reactants, and there is therefore no theoretical minimum time. Nor is there any theoretical limit to the length of time over which the reaction conditions may be maintained, save that imposed by economic considerations of reactor space utilization, and also a tendency of the methylstannic acid to disproportionate into dimethyltin oxide and tin oxide, with consequent loss of the desired product. This latter disadvantage comes into play at reaction times in excess of about 120 hours at 25° C., the time being an inverse function of the temperature of reaction. In some cases it may be desired to allow the disproportionation to proceed to a greater or lesser extent, if it is desired to obtain a certain proportion of dimethyltin oxide in the product.

The progress of the reaction may readily be followed by periodic removal of samples, from which the methylstannic acid is precipitated and isolated by the technique of acidification and back-neutralization to which the entire reaction mass is later subjected as described hereinbelow. The precipitate is then dried and weighed, and then assayed for its content of active methylstannic acid in a process in which the product is reacted with dodecyl mercaptan (or other mercaptan which does not react readily with unreactive forms of methylstannic acid) and the undissolved material filtered off, washed with an organic solvent, dried, and weighed. The loss will represent the reactive methylstannic acid. The dried precipitate consists of alkali metal salts, inorganic tin oxides (of varying degrees of hydration) and unreactive forms of methylstannic acid; the salts may be determined by dissolving out the salts with water, and filtering off, drying and weighing the undissolved unreactive methylstannic acid and tin oxides.

THE ACIDIFICATION AND BACK-NEUTRALIZATION TECHNIQUE OF PRECIPITATION

Methylstannic acid is amphoteric in that it dissolves in both acid and alkaline aqueous media. The reaction mixture in which it is formed in accordance to this invention is alkaline, and therefore the mixture must be acidified to the neutral point in order to isolate the product by filtration. However simple neutralization results in a methylstannic acid product having diminished chemical reactivity, particularly toward higher hydrocarbon mercaptans. In accordance with this invention, the reaction mixture is first carried from an alkaline condition past the neutral point to a condition of acidity such that the methylstannic acid does not completely precipitate, but remains partly or wholly in solution or dispersion. A pH of 3.5 or less at this point will effect the purposes of this invention. Any convenient moderately strong acid may be used for the acidification, such as hydrochloric acid, sulfuric acid, phosphoric acid, nitric acid, oxalic acid or the like. The reaction mass is then back-neutralized to a pH of from 5 to 7, preferably from 5.5 to 6.0, whereupon the methylstannic acid precipitates substantially completely from the solution and may be separated by filtration, centrifugation, or other mechanical separation methods. Any convenient base may be used for the back-neutralization, such as sodium hydroxide, potassium hydroxide, lithium hydroxide or ammonium hydroxide. The resultant product has excellent reactivity toward mercaptans.

It will be preferred to filter the methylstannic acid at all times in contact with the saline mother liquor in which it is formed, or in contact with an aqueous solution of equivalent salt content, as methylstannic acid tends to gelatinize and redisperse in pure water. The filtered and dried product will accordingly have a substantial content of salt which, however, will be immaterial in most uses: for instance the salt-containing product may be reacted with mercaptans to form methyltin trimercaptides from which the salt may be removed by filtration.

The invention is illustrated in the accompanying drawing, which is a flow sheet of the process of this invention.

With the foregoing general discussion in mind, there are given herewith detailed examples of the practice of this invention. All parts and percentages given are by weight, unless otherwise stated.

Example 1

A { Stannous chloride (anhydrous). — 31.1 lbs. (1 molecular proportion).
Demineralized water — 93.4 lbs.

B { Sodium hydroxide (flake, 98% pure. — 37.1 lbs. (5.5 molecular proportions).
Demineralized water — 148.5 lbs.

Methyl chloride — 25.5 lbs. (3.0 molecular proportions).

Concentrated hydrochloric acid (C. P., contains 37% HCl). — 40.0 lbs. (2.5 molecular proportions).

Aqueous sodium hydroxide solution (20% NaOH). — 8.5 lbs. (0.25 molecular proportions).

A 50 gallon nickel-clad pressure reactor provided with a rotary agitator and with a cooling water jacket was used in this portion of the process. A caustic solution was made up from the ingredients listed at "B" by adding the sodium hydroxide to the water in the reactor, and cooling to 45° F. Agitation was commenced and maintained throughout the process as described below, until discharge of the product from the reactor. A stannous chloride solution was made up from the ingredients listed at "A" and added to the caustic solution. Ice water was circulated through the jacket of the reactor, and the addition was carried out at such a rate that the temperature of the mass inside the reactor did not rise above 50° F.

The reactor was then sealed, and the methyl chloride introduced under pressure. The temperature during the introduction was kept below 50° F. so that the pressure did not rise above 50 pounds per square inch. Following addition of the methyl chloride, the reaction was permitted to proceed at temperatures which were held between 70° F. and 80° F. A sample taken at the end of 53 hours indicated that the reaction was substantially complete; however, the reaction conditions were nevertheless maintained for a total of 87 hours. At the end of this time, the excess methyl chloride was blown off and recovered.

The reaction mass was next discharged through a cotton cloth filter, which removed the very small amount of solid matter in the reaction mass, to a 60 gallon glass-lined tank provided with a rotary stirrer. The hydrochloric acid was added to the mass, whereby the pH was reduced to 3.5 as indicated on a Beckman pH meter. Partial precipitation of the methylstannic acid resulted. The 20% sodium hydroxide solution was then added, whereby the pH was raised to 5.8, and precipitation of methylstannic acid became substantially complete.

The mass was next filtered through a stainless steel filter press, having an acrylonitrile-vinyl chloride copolymer facing cloth ("Vinyon N" manufactured by the Carbide and Carbon Chemicals Corp.) backed by a cotton cloth. The precipitate was not washed in the filter press but was removed and dried in a Proctor and Schwartz tray drier for 18 hours at 238° F. The dried product was pulverized and amounted to 27.8 pounds. An assay was run as described below, and indicated that the product contained 81% reactive methylstannic acid (a yield of 82.7% of theory, based on the weight of stannous chloride used) 18% water soluble salts, and 1% unreactive material.

The assay for the above determination, and also for the determination of the extent of the reaction from the samples taken during the process was run as follows. Ten grams of the dried sample were added portionwise to 60 grams of a commercial dodecyl mercaptan at 110°–130° C., and the mixture was then heated to 160°–170° C. for five minutes, cooled and filtered. The filter cake was washed with benzene, dried and weighed, this weight being taken as the weight of salts plus the weight of unreactive tin compounds. The filter cake was then suspended in 20 c. c. of water, and filtered, and the filter cake dried and weighed, this latter weight being taken as the weight of unreactive tin compounds in the mixture.

The liquid samples taken in the course of the process of this invention were precipitated preparatory to the above assay as follows. To a 400-gram sample were added successively 40–45 ml. of concentrated hydrochloric acid to bring the pH down to 3.5, and 10–20 c. c. of 20% aqueous sodium hydroxide solution to raise the pH to 5.5. The resultant slurry was filtered, dried at 115° C. for 4 hours, and weighed, this weight being taken as the total of methylstannic acid, salt and unreactive tin compounds in the product if taken at the time when the sample was taken.

*Example II.—Variation of back-neutralization*

A run was made exactly similar to that of Example I, except that 25 pounds of methyl chloride were charged in place of 25.5 pounds, and the reaction was run for 138 hours instead of 87 hours. A series of 400-gram samples of the final action mixture was taken, and each sample was either directly neutralized with concentrated hydrochloric acid to a selected final pH, or first made strongly acid (pH<1.0) with concentrated hydrochloric acid and then back-neutralized with sodium hydroxide to the selected final pH. The resultant slurry was then filtered and the precipitate assayed as described in Example I. Tabulated herewith in Table I are the pH conditions to which the several samples were adjusted, together with the yield and assay of the product.

TABLE I.—PRECIPITATION OF 400 GRAMS OF SODIUM METHYLSTANNATE REACTION MIXTURE WITHOUT AND WITH PREVIOUS COMPLETE ACIDIFICATION

| Preliminarily Acidified to pH<1.0 | Final pH at 25° C. | Final Wt. of Dry Product (gms.) | Assay of Dry Product | | | Yield of Pyromethylstannic Acid (percent of theory)[a] |
|---|---|---|---|---|---|---|
| | | | Dodecyl Mercaptan Soluble (percent) | Sodium Chloride (percent) | Unreactive Material (percent) | |
| no | 6.25 | 40.4 | 61 | 22 | 17 | 74 |
| yes | 6.4 | 42.8 | 77 | 21 | 2 | 99 |
| no | 5.75 | 40.8 | 74 | 22 | 4 | 91 |
| yes | 5.75 | 44.1 | 77 | 21 | 1 | 102 |
| no | 5.3 | 40.5 | 77 | 20 | 3 | 94 |
| yes | 5.3 | 46.7 | 73 | 26 | 1 | 102 |
| no | 4.8 | 42.8 | 75 | 23 | 2 | 96 |
| yes | 4.8 | 42.7 | 78 | 21 | 1 | 100 |

[a] The 400-gram sample of liquor used should theoretically yield 33.30 grams (0.2053 gram-mole) of pyromethylstannic acid (N. W., 162.23).

In order to illustrate the variation of pH and precipitation behavior of the reaction mixture with addition of HCl, concentrated aqueous hydrochloric acid containing 37% HCl was gradually measured into 400 grams of the final sodium methylstannate solution. Set forth herewith in Table II are the values of the pH observed.

TABLE II

| Hydrochloric acid added (ml) | 0 | 4 | 6 | 12 | 30 | 38 | 39 | 42 | 43 | 44 | 82 |
|---|---|---|---|---|---|---|---|---|---|---|---|
| pH @ 25° C | 12.5 | 12.5 | 12.48 | 12.25 | 10.6 | 7.0 | 6.1 | 4.1 | 3.75 | 3.32 | 0.42 |
| Clarity of solution | clear | clear | slightly cloudy | some precipitate | complete precipitate | | | | partly dissolved | | clear solution |

*Example III*

A { Hydrated stannous chloride ($SnCl_2 \cdot 2H_2O$)_ 45.2 grams.
    Water _____ 131 ml.
B { Sodium hydroxide _____ 50 grams.
    Water _____ 182 ml.
Methyl chloride _____ 50 grams.
Concentrated hydrochloric acid_____ 50 ml.

A solution was made up from the stannous chloride and water listed at "A" and another solution was made up from the sodium hydroxide and water listed at "B." The stannous chloride solution was added to the sodium hydroxide solution over a period of three minutes with vigorous stirring. A precipitate of stannous oxide began to form shortly after completion of the mixture.

The mixture was then transferred to a 28-ounce beverage bottle, and cooled to 10° C. The methyl chloride was then added, and the bottle sealed with a polyethylene-lined crown cap and tumbled at 42° C. for five hours, at which time the precipitate of tin oxide had substantially disappeared. The bottle was cooled to 25° C., the methyl chloride bled off, and the bottle opened. The hydrochloric acid was then added, resulting in a pH of 2.5, and the liquor back-neutralized with sodium hydroxide solution to a pH of 6.5. The precipitate was removed by filtration and dried for two hours at 120° C. An assay conducted as described in Example I indicated that the product contained 75% of reactive pyromethylstannic acid, 24% of sodium chloride and 1% of unreactive material.

From the foregoing general discussion and detailed specific examples, it will be evident that this invention provides a novel process for the production of methylstannic acid which makes use of purely aqueous reaction media, and of the cheaply and abundantly available methyl chloride. The process may, and preferably does, make use of the relatively cheaper sodium hydroxide rather than potassium hydroxide. The process may be carried out in relatively simple equipment, without unduly elaborate supervision or control. The product methylstannic acid is obtained in good yields and in a form having excellent reactivity with mercaptans and other compounds which it may be desired to react therewith.

What is claimed is:

1. Process which comprises carrying out, in a solvent consisting of water, the series of reactions comprising (a) preparing a solution of an alkali metal stannite containing an excess of from 0.5 to 2.5 moles of an alkali metal hydroxide for each mole of the alkali metal stannite, (b) reacting the alkali metal stannite solution with liquid methyl chloride at temperatures from 0° to 85° C., (c) adjusting the pH of the solution to the range of 3.5 and below, (d) raising the pH to from 5.0 to 7.0 whereby to effect precipitation of methylstannic acid from the solution, and (e) mechanically separating the methylstannic acid from the solution.

2. Process which comprises carrying out, in a solvent consisting of water, the series of reactions comprising (a) preparing a solution of sodium stannite containing an excess of from 0.5 to 2.5 moles of sodium hydroxide for each mole of the sodium stannite, (b) reacting the sodium stannite solution with liquid methyl chloride at temperatures from 0° to 85° C., (c) adjusting the pH of the solution to the range of 3.5 and below, (d) raising the pH to from 5.0 to 7.0 whereby to effect precipitation of methylstannic acid from the solution, and mechanically separating the methylstannic acid from the solution.

3. Process which comprises carrying out, in a solvent consisting of water, the series of reactions comprising (a) preparing a solution of an alkali metal stannite containing an excess of about 1.5 moles of an alkali metal hydroxide for each mole of the alkali metal stannite, (b) reacting the alkali metal stannite solution with liquid methyl chloride at temperatures from 0° to 85° C., (c) adjusting the pH of the solution to the range of 3.5 and below, (d) raising the pH to from 5.0 to 7.0 whereby to effect precipitation of methylstannic acid from the solution, and mechanically separating the methylstannic acid from the solution.

4. Process which comprises carrying out, in a solvent consisting of water, the series of reactions comprising (a) preparing a solution of sodium stannite containing an excess of about 1.5 moles of sodium hydroxide for each mole of the sodium stannite, (b) reacting the sodium stannite solution with liquid methyl chloride at temperatures from 0° to 85° C., (c) adjusting the pH to the range of 3.5 and below, (d) raising the pH to from 5.0 to 7.0 whereby to effect precipitation of methylstannic acid from the solution, and mechanically separating the methylstannic acid from the solution.

5. Process which comprises carrying out, in a solvent consisting of water, the series of reactions comprising (a) preparing a solution of sodium stannite containing an excess of from 0.5 to 2.5 moles of sodium hydroxide for each mole of the sodium stannite, (b) reacting the sodium stannite solution with liquid methyl chloride at temperatures from 0° to 85° C., (c) adjusting the pH to about 3.5, (d) raising the pH to from 5.0 to 7.0 whereby to effect precipitation of methylstannic acid from the solution, and mechanically separating the methylstannic acid from the solution.

6. Process which comprises carrying out, in a solvent consisting of water, the series of reactions comprising (a) preparing a solution of sodium stannite containing an excess of about 1.5 moles of sodium hydroxide for each mole of the sodium stannite, (b) reacting the sodium stannite solution with liquid methyl chloride at temperatures from 0° to 85° C., (c) adjusting the pH of the solution to about 3.5, (d) raising the pH to from 5.0 to 7.0 whereby to effect precipitation of methylstannic acid from the solution, and mechanically separating the methylstannic acid from the solution.

7. Process which comprises carrying out, in a solvent consisting of water, the series of reactions comprising (a) preparing a solution of sodium stannite containing an excess of from about 1.5 moles of sodium hydroxide for each mole of the sodium stannite, (b) reacting the sodium stannite solution with liquid methyl chloride at temperatures from 0° to 100° C., (c) adjusting the pH of the solution to about 3.5, (d) raising the pH to from 5.5 to 6.0 whereby to effect precipitation of methylstannic acid from the solution, and mechanically separating the methylstannic acid from the solution.

KENNETH C. EBERLY.
CHRIS E. BEST.

REFERENCES CITED

The following references are of record in the file of this patent:

FOREIGN PATENTS

| Number | Country | Date |
|---|---|---|
| 294,287 | Great Britain | July 23, 1928 |

OTHER REFERENCES

Chem. Abstracts, vol. 19, page 3,227, 1925.